(12) United States Patent
Moriyama

(10) Patent No.: US 7,672,345 B2
(45) Date of Patent: Mar. 2, 2010

(54) SEMICONDUCTOR LASER DRIVE CONTROL APPARATUS

(75) Inventor: Tsuyoshi Moriyama, Toride (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/356,530

(22) Filed: Jan. 20, 2009

(65) Prior Publication Data
US 2009/0129416 A1 May 21, 2009

Related U.S. Application Data

(62) Division of application No. 11/193,706, filed on Jul. 29, 2005, now abandoned.

(30) Foreign Application Priority Data

Jul. 29, 2004 (JP) .............................. 2004-221957
Jul. 29, 2004 (JP) .............................. 2004-221958

(51) Int. Cl.
*H01S 3/00* (2006.01)

(52) U.S. Cl. .............................. 372/29.01; 372/29.011; 372/29.012; 372/29.014; 372/29.015; 372/29.02; 372/29.021; 372/31; 372/38.1; 372/38.01; 372/38.02; 372/38.04; 372/38.07; 347/132; 347/133; 347/236; 347/246; 347/249; 347/252; 347/253; 347/255

(58) Field of Classification Search ............. 372/29.01, 372/29.011, 29.012, 29.014, 29.015, 29.02, 372/29.021, 31, 38.1, 38.01, 38.02, 38.04, 372/38.07; 347/132, 133, 236, 246, 247, 347/248, 249, 252, 253, 255
See application file for complete search history.

(56) References Cited

U.S. PATENT DOCUMENTS

| 4,695,849 A | 9/1987 | Dei |
| 4,831,392 A | 5/1989 | Dei |
| 5,867,516 A | 2/1999 | Corzine et al. |
| 6,917,639 B2 | 7/2005 | Ishida et al. |
| 2006/0159143 A1 | 7/2006 | Schleipen et al. |

FOREIGN PATENT DOCUMENTS

| JP | 4-283978 A | 10/1992 |
| JP | 9-83050 A | 3/1997 |
| JP | 11-42815 A | 2/1999 |
| JP | 11-52581 A | 2/1999 |
| JP | 2001-315381 A | 11/2001 |
| JP | 2002-321402 A | 11/2002 |
| JP | 2003-347664 A | 11/2003 |

OTHER PUBLICATIONS

Office Action dated Oct. 14, 2008 issued in Japanese application No. 2004-221957 which corresponds to parent application U.S. Appl. No. 11/193,706.
Office Action dated Oct. 14, 2008 issued in Japanese application No. 2004-221958 which corresponds to parent application U.S. Appl. No. 11/193,706.

*Primary Examiner*—Wael Fahmy
*Assistant Examiner*—Hrayr A Sayadian
(74) *Attorney, Agent, or Firm*—Rossi, Kimms & McDowell, LLP

(57) ABSTRACT

A drive signal for driving a semiconductor laser is generated on the basis of an image signal inputted in synchronism with a pixel clock. A bias signal to the semiconductor laser is generated at a timing earlier than the drive signal by a predetermined time. The bias signal is disabled in synchronism with the leading edge of the drive signal.

1 Claim, 14 Drawing Sheets

SEMICONDUCTOR LASER DRIVE CONTROL APPARATUS

This is a divisional of U.S. patent application Ser. No. 11/193,706 filed Jul. 29, 2005.

FIELD OF THE INVENTION

The present invention relates to a technique of driving a semiconductor laser used in an image forming apparatus such as a laser printer, digital copying machine, or communication apparatus.

BACKGROUND OF THE INVENTION

As semiconductor laser driving methods, a zero-bias driving method and bias driving method have conventionally been used. According to the zero-bias driving method, the bias current of a semiconductor laser is set to 0, and the laser is driven by a pulse current corresponding to an input signal. According to the bias driving method, the bias current of a semiconductor laser is set to a predetermined threshold current, and the laser is driven by adding a pulse current corresponding to an input signal to a bias current while always supplying the bias current.

When a semiconductor laser is activated from a zero-bias state, an emission delay generally occurs because a given time is taken until carriers of a concentration enough to oscillate a laser are generated after a drive current corresponding to an input signal is applied to the semiconductor laser. When the semiconductor laser is driven at a high speed, only a pulse whose width is smaller than a desired one can be obtained.

In order to shorten the delay time till laser oscillation, there is proposed a method of supplying an oscillation threshold current as a bias current to a semiconductor laser in advance. In particular, recent laser printers, digital copying machines, DVD apparatuses, and the like require higher image qualities, and systems using a 650-nm red semiconductor laser and 400-nm blue-violet semiconductor laser have come into practical use.

The red semiconductor laser applied to a laser printer, digital copying machine, or the like emits an optical output of about several ten μW while a bias current is supplied. The influence of ground stain (fog) by the bias current can be ignored.

To the contrary, some of blue-violet semiconductor lasers emit an optical output of about 1 mW during supply of the bias current, and the optical output is higher than that of the red semiconductor laser. A blue-violet semiconductor laser having a narrow far-field pattern can expose a photosensitive material by an optical output of about 3 mW. Hence, the difference between the exposure potential and the non-exposure potential on the photosensitive material becomes smaller than a conventional one, and the development bias setting range of whether to apply toner also becomes narrower. When the blue-violet semiconductor laser is applied to a laser printer, digital copying machine, or the like, ground stain (fog) occurs owing to variations in laser emission characteristic.

The blue-violet semiconductor laser has a short wavelength, and its laser spot can be easily narrowed down in comparison with the red semiconductor laser. However, the voltage drop by the blue-violet semiconductor laser is large, and power consumption of the laser increases. Large power consumption raises the temperature and shortens the service life of the laser itself.

When the blue-violet semiconductor laser is used in a laser printer, digital copying machine, or the like, application of the zero-bias driving method is examined. In the optical communication field, there is proposed an arrangement in which the zero-bias driving method is basically used and an oscillation threshold current (bias current) is supplied immediately before a drive current for causing a semiconductor laser to emit light is supplied (e.g., prior art reference 1: Japanese Patent Laid-Open No. 4-283978, and prior art reference 2: Japanese Patent Laid-Open No. 9-83050). In these proposals, a delay circuit which delays an input signal by a predetermined time is arranged, and the drive current is set "ON" by an output from the delay circuit.

However, the following problems arise when the arrangements in prior art references 1 and 2 are applied to an image forming apparatus such as a laser printer or digital copying machine.

Experimental results reveal that, to activate a semiconductor laser after a long laser OFF period, the laser can be generally stably activated after a bias current is supplied for at least several nsec. For image data for which the laser OFF period of the semiconductor laser is short, the semiconductor laser can respond only by supplying a bias current for a period shorter than the above-mentioned period because of the influence of residual charges of a driver and the characteristics of the semiconductor laser.

In prior art references 1 and 2, the semiconductor laser is driven after a delay of a predetermined time from an input signal. For example, the bias current keeps flowing even during the OFF period for image data (high-density image) for which the OFF period t is shorter than the delay time τ, as shown in FIG. 11. Weak exposure is undesirably caused by the bias current during the OFF period, i.e., at a white pixel, and toner is applied to the white pixel.

To prevent these problems, when the arrangements in prior art references 1 and 2 are applied to an image forming apparatus, the timing at which the bias current is supplied is desirably generated not by delaying image data but by controlling the ON timing of the bias current.

If the laser is driven with a delay of a predetermined time from an input signal, like prior art references 1 and 2, the image write position shifts by the delay time, and thus must be controlled in advance in consideration of the delay time. In order to generate a very short delay time, the delay circuit requires a high-precision element excellent in temperature characteristic, and raises the cost in comparison with a conventional laser drive circuit. In order to control the image write position, a precise delay amount must be fed back to the write control system, and control of the image write position becomes complicated.

When a delay circuit which delays an input signal is formed from a multistage buffer IC or the like, delayed outputs slightly vary in time owing to the threshold voltage in the buffer IC. Such variations do not matter in the optical communication field. However, in a high-quality digital copying machine and printer, the variation width generates a high-frequency jitter, and the jitter image appears in the sub-scanning direction, degrading the image quality.

SUMMARY OF THE INVENTION

The present invention has been made to overcome the conventional drawbacks, and has as its object to prevent generation of weak exposure by a bias current when a blue-violet semiconductor laser is used as a semiconductor laser.

It is another object of the present invention to reduce power consumption of a semiconductor laser with a simple arrangement when a blue-violet semiconductor laser is used as a semiconductor laser.

In order to achieve the above objects, according to one aspect of the present invention, there is provided a semiconductor laser drive control apparatus which drives a semiconductor laser on the basis of an input image signal, comprising:

drive signal generation means for generating, on the basis of an image signal inputted in synchronism with a pixel clock, a drive signal for driving the semiconductor laser; and bias signal generation means for generating a bias signal to the semiconductor laser at a timing earlier than the drive signal by a predetermined time, and disabling the bias signal on the basis of the drive signal.

According to another aspect of the present invention, there is provided a semiconductor laser drive control apparatus which drives a semiconductor laser on the basis of an input image signal, comprising:

delay means for delaying by one pixel an image signal inputted in synchronism with a pixel clock;

drive signal generation means for generating, on the basis of the image signal delayed by one pixel, a drive signal for driving the semiconductor laser; and bias signal generation means for generating a bias signal to the semiconductor laser on the basis of the input image signal, wherein the bias signal is generated in synchronism with a leading edge or a trailing edge of the pixel clock before the drive signal is generated.

According to still another aspect of the present invention, there is provided a semiconductor laser drive control method of driving a semiconductor laser on the basis of an input image signal, comprising:

a drive signal generation step of generating, on the basis of an image signal inputted in synchronism with a pixel clock, a drive signal for driving the semiconductor laser; and a bias signal generation step of generating a bias signal to the semiconductor laser at a timing earlier than the drive signal by a predetermined time, and disabling the bias signal on the basis of the drive signal.

According to still another aspect of the present invention, there is provided a semiconductor laser drive control method of driving a semiconductor laser on the basis of an input image signal, comprising:

a delay step of delaying by one pixel an image signal inputted in synchronism with a pixel clock;

a drive signal generation step of generating, on the basis of the image signal delayed by one pixel, a drive signal for driving the semiconductor laser; and a bias signal generation step of generating a bias signal to the semiconductor laser on the basis of the input image signal, wherein the bias signal is generated in synchronism with a leading edge or a trailing edge of the pixel clock before the drive signal is generated.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

Figure 1:
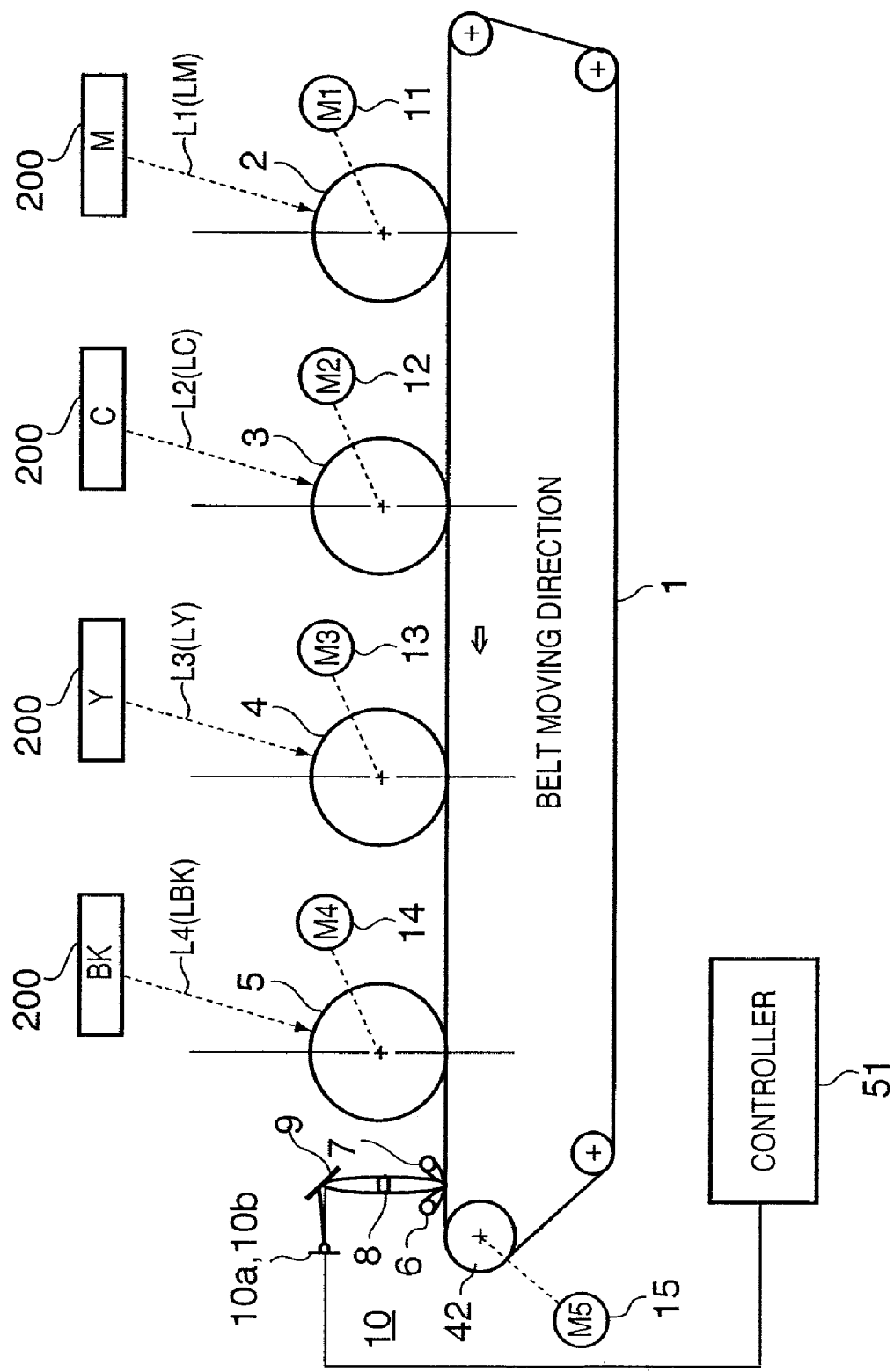
FIG. 1 is a view showing an example of the arrangement of a color image forming apparatus according to the first embodiment.

FIG. 1 is a view showing an example of the arrangement of a color image forming apparatus according to the first embodiment. In FIG. 1, reference numeral 1 denotes a transfer belt which is moved at a predetermined speed in a direction indicated by an arrow by transferring the drive force of a pulse motor 15 to a drive roller 42. Reference numerals 2 to 5 denote photosensitive drums which respectively correspond to magenta (M), cyan (C), yellow (Y), and black (BK) in an order named. The photosensitive drums 2 to 5 of the respective colors are rotated and driven by corresponding drum motors 11 to 14, and uniformly charged by charging units (not shown). The photosensitive drums 2 to 5 of the respective colors are irradiated with corresponding laser beams LM (L1), LC (L2), LY (L3), and LBK (L4) from laser scanner units 200(M), 200(C), 200(Y), and 200(BK). The laser scanner unit 200 will be described later with reference to FIG. 2.

Electrostatic latent images formed by scanning of the laser beams LM (L1), LC (L2), LY (L3), and LBK (L4) are developed and visualized with toners stored in developing units (not shown). The images formed on the photosensitive drums 2 to 5 of the respective colors are transferred at predetermined timings onto a transfer paper sheet which is fed from a paper feed unit (not shown) and electrostatically chucked onto the transfer belt 1. The paper sheet is conveyed in the direction indicated by the arrow by driving the pulse motor 15, fixed by a fixing unit (not shown), and then delivered onto a delivery tray (not shown). In this manner, an image formed by the image forming process is transferred onto a transfer paper sheet, and the sheet is delivered.

The image forming apparatus has a registration correction function of superimposing magenta (M), cyan (C), yellow (Y), and black (BK) images. The correction function is implemented by readers (CCD sensors) 10, a controller 51 which controls the readers (CCD sensors) 10, and the like. The reader (CCD sensor) 10 is also used to determine correction amounts for the rise and fall delays (to be described later) of the laser.

The registration correction method using the reader (CCD sensor) 10 will be explained. In the first embodiment, pairs of magenta (M), cyan (C), yellow (Y), and black (BK) registration correction patterns are formed by the image forming process so as to face each other at predetermined positions in the widthwise direction perpendicular to the convey direction of the transfer belt 1.

As shown in FIG. 1, a pair of readers (CCD sensors) 10 are arranged in a direction perpendicular to the convey direction of the transfer belt 1. Each reader (CCD sensor) 10 comprises identical illumination lamps 6 and 7, a condenser lens 8, a reflecting mirror 9, and sensors 10*a* and 10*b* each formed from a CCD. Reflected light obtained by illuminating a registration correction pattern (e.g., a cross-shaped mark with a predetermined width) formed on the transfer belt 1 which moves along with driving of the pulse motor 15 is formed into images on the sensors 10*a* and 10*b* to read the registration correction pattern.

The controller 51 controls read of the registration correction pattern by the reader (CCD sensor) 10 and calculates the registration shift amount of each color from the read pattern. Based on the calculation results, the controller 51 calculates the electrical image write timings of main scanning and sub-scanning, and correction amounts for a change of the light path length of the laser and a change of the light path. The controller 51 sends position correction data of main scanning to a main scanning position correction unit (to be described later), and sends position correction data of sub-scanning to a laser ON/OFF signal generation unit (to be described later). In order to correct a change of the light path length of the laser and a change of the light path, the controller 51 supplies, to a pulse motor driver (not shown), pulse data of a pulse motor (not shown) which drives and controls the reflecting mirror inserted in the light path.

The controller 51 comprises a CPU which executes the above-described control, a ROM which stores the control programs and control data of the CPU, a RAM which includes a work area used by the CPU to execute control, various tables, and the like, and peripheral circuits such as a timer and communication interface.

In this way, registration correction for superimposing magenta (M), cyan (C), yellow (Y), and black (BK) images is achieved.

Figure 2:
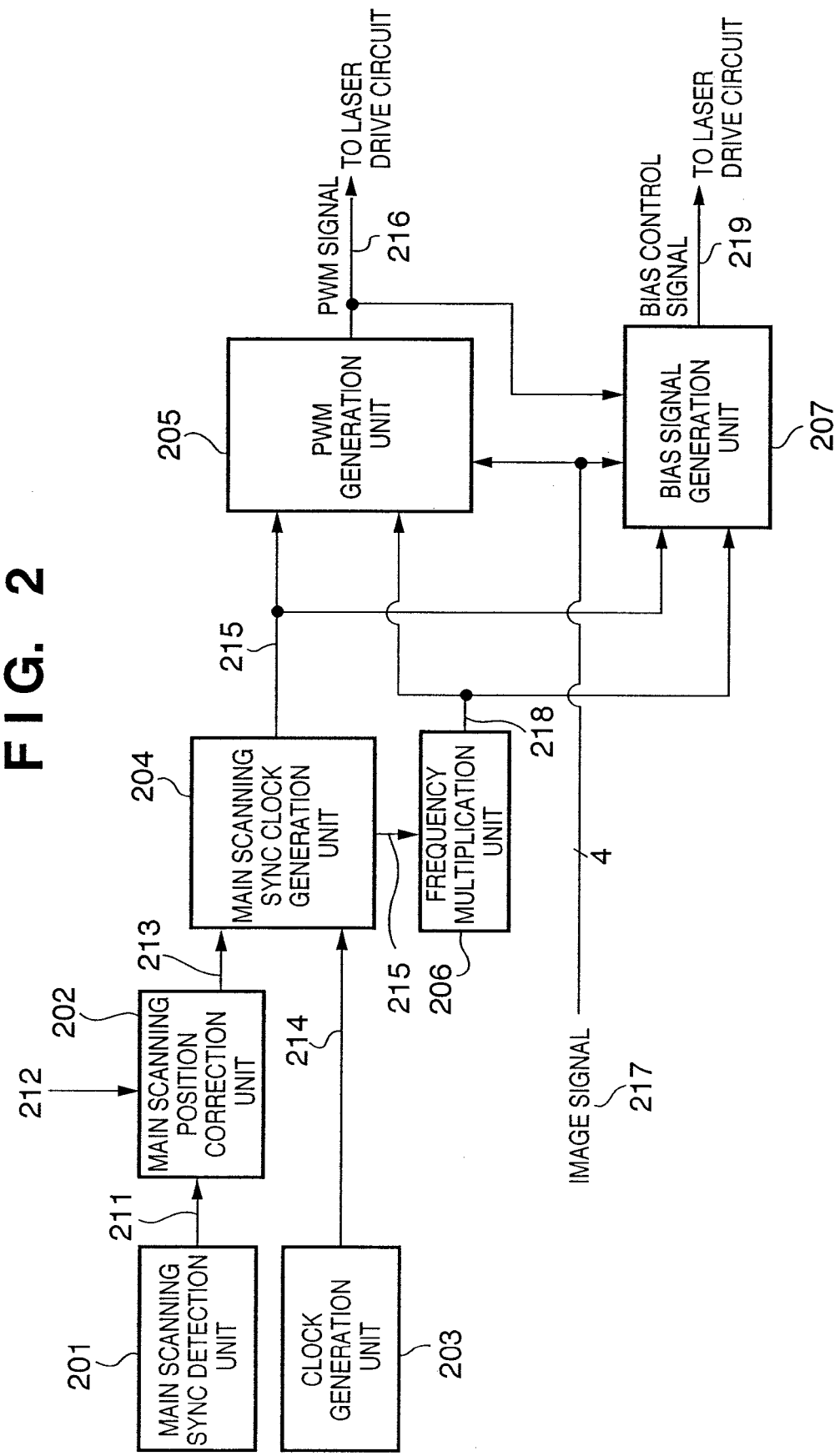
FIG. 2 is a block diagram showing an example of the arrangement of a laser scanner unit according to the first embodiment.

The arrangement and operation of the laser scanner unit will be explained with reference to FIG. 2. In the color image forming apparatus, a total of four laser units shown in FIG. 2 are mounted respectively for yellow, magenta, cyan, and black. A relative shift amount of each color in the main scanning direction is calculated by the controller 51 shown in FIG. 1 using the registration correction function of the reader 10. A position correction amount for each color is inputted to the main scanning position correction unit (to be described later) for each color, and the shift of each color in the main scanning direction is corrected in units of 1/n of a pixel.

FIG. 2 is a block diagram showing an example of the arrangement of the laser scanner unit according to the first embodiment. In FIG. 2, reference numeral 201 denotes a main scanning sync detection unit. Reference numeral 202 denotes a main scanning position correction unit which corrects a main scanning sync signal 211 outputted from the main scanning sync detection unit 201 by a delay amount designated by a position correction amount designation signal 212 from the controller 51. Reference numeral 203 denotes a clock generation unit which generates a base clock 214.

Reference numeral 204 denotes a main scanning sync clock generation unit which receives a main scanning sync signal 213 corrected by the main scanning position correction unit 202 and the base clock 214 outputted from the clock generation unit 203, and outputs a pixel clock 215 synchronized with the corrected main scanning sync signal 213.

Reference numeral 205 denotes a PWM generation unit which modulates the pulse width of an image signal 217 having undergone a predetermined image process by an image processing unit (not shown), on the basis of the pixel clock 215 outputted from the main scanning sync clock generation unit 204 and an n-time clock outputted from a frequency multiplication unit (to be described later), and outputs the modulated image signal 217 as a PWM signal (laser ON/OFF signal) 216 to a laser drive circuit (to be described later).

Reference numeral 206 denotes a frequency multiplication unit which converts the pixel clock 215 outputted from the main scanning sync clock generation unit 204 into an n-time clock.

Reference numeral 207 denotes a bias signal generation unit which outputs, on the basis of the pixel clock 215, the image signal 217, an n-time clock 218, and the PWM signal 216, a bias control signal 219 for ON/OFF-controlling the bias current of the laser drive circuit. The timing of the bias control signal 219 will be described with reference to FIG. 5.

The arrangement and operation of the laser drive circuit which drives a semiconductor laser on the basis of the PWM signal (laser ON/OFF signal) 216 and bias control signal 219 which are outputted from the laser scanner unit 200 for each color will be explained with reference to FIG. 3.

Figure 3:
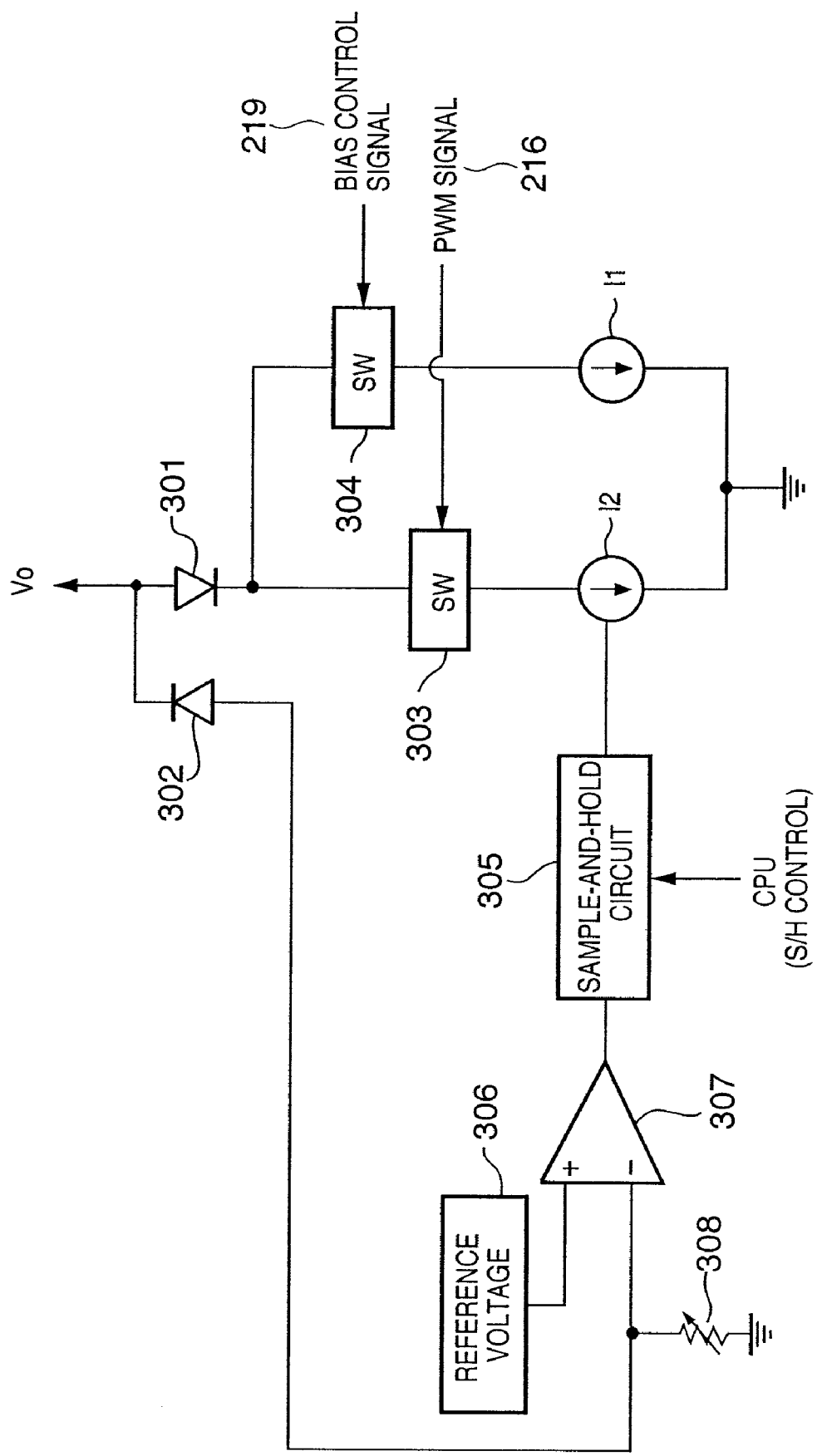
FIG. 3 is a circuit diagram showing the schematic arrangement of a laser drive circuit according to the first embodiment.

FIG. 3 is a circuit diagram showing the schematic arrangement of the laser drive circuit according to the first embodiment. In FIG. 3, reference numeral 301 denotes a semiconductor laser; 302, a photodiode serving as a laser beam quantity detection means for detecting the emission amount of the semiconductor laser 301; 303 and 304, switching circuits; 305, a sample-and-hold circuit; 306, a preset reference voltage; 307, an error amplifier; 308, an adjustment pre-set variable resistor; I1, a bias current source; and I2, a modulated-current source. The first embodiment employs a blue-violet semiconductor laser as the semiconductor laser 301.

In the laser drive circuit having the above arrangement, the semiconductor laser 301 is modulated by turning on/off the switching circuit 303 by the PWM signal 216 outputted from the laser scanner unit 200. The value of a current flowing through the semiconductor laser 301 is controlled by the modulated-current source I2. The back beam of the semiconductor laser 301 is detected by the photodiode 302, and a current flows through the adjustment pre-set variable resistor 308 to generate a voltage proportional to the laser beam quantity. The voltage generated by the adjustment pre-set variable resistor 308 is compared with the reference voltage 306 by the error amplifier 307, and the result is outputted to the sample-and-hold circuit 305.

In APC (Auto Power Control) operation using the photodiode 302, the sample-and-hold circuit 305 is set in a sampling mode by a sample/hold signal outputted from the CPU of the controller 51, the modulated-current source I2 is controlled by an output from the error amplifier 307, and the value of a current flowing through the semiconductor laser 301 changes. If no APC operation is performed, the sample-and-hold circuit 305 is set in a holding mode by the sample/hold signal outputted from the CPU of the controller 51, and an image is formed in accordance with the Low/High level of the PWM signal 216. The switching circuit 304 is turned on/off by the bias control signal 219 at a predetermined timing (to be described later).

Figure 4:
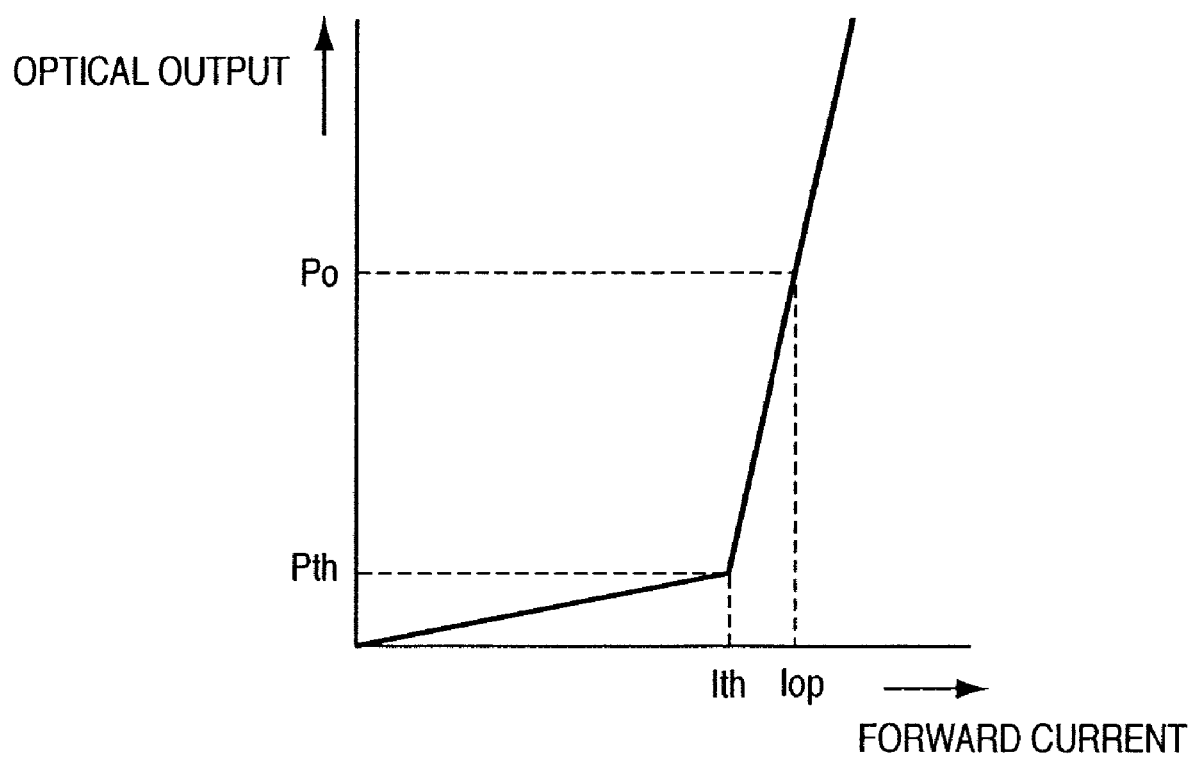
FIG. 4 is a graph showing the current-to-optical output characteristic of a semiconductor laser.

FIG. 4 is a graph showing the current-to-optical output characteristic of the semiconductor laser. In FIG. 4, Ith represents a threshold current; Pth, an optical output at the threshold current; Iop, a modulated current value; and Po, an optical output at the modulated current value. As shown in FIG. 4, the semiconductor laser 301 emits spontaneous emission light until the optical output reaches Pth, but when the optical output exceeds Pth, the laser oscillates.

The bias current is generally set slightly smaller than the threshold current. However, while the bias current flows, a blue-violet semiconductor laser may weakly expose a photosensitive member because it is larger in power of spontaneous emission light than an infrared semiconductor laser and red semiconductor laser.

To prevent this, the timing at which the bias current is supplied must be properly controlled. The timing of each signal for controlling the laser drive circuit according to the first embodiment will be described with reference to FIG. 5.

Figure 5:
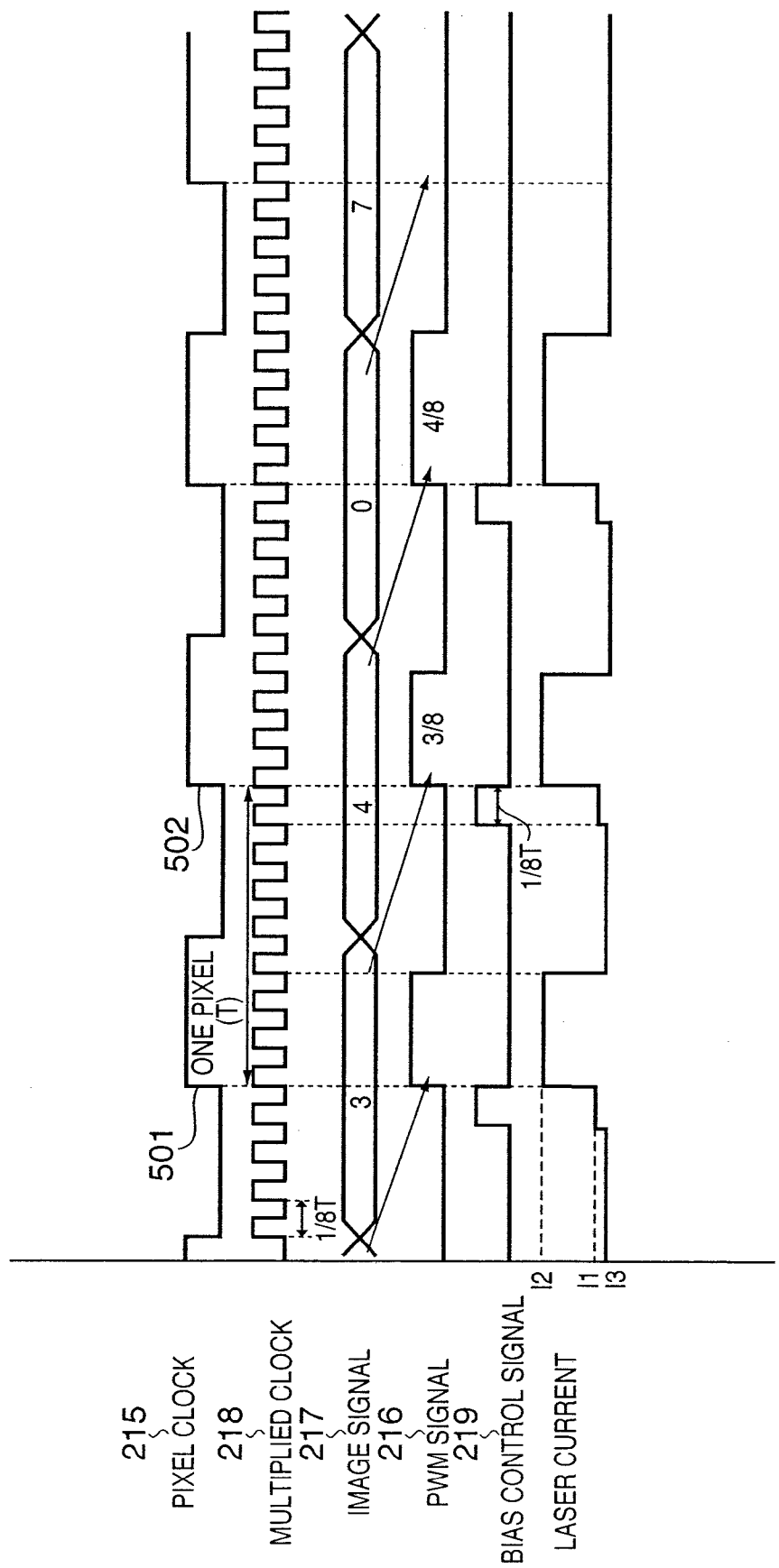
FIG. 5 is a timing chart showing each signal for controlling the laser drive circuit according to the first embodiment.

FIG. 5 is a timing chart showing each signal for controlling the laser drive circuit according to the first embodiment. In FIG. 5, the pixel clock 215 is a clock which is outputted from the main scanning sync clock generation unit 204 and enabled/disabled in the cycle of one pixel. In the first embodiment, the clock frequency is 20 MHz, and one pixel corresponds to 50 nsec.

The multiplied clock 218 is obtained by multiplying the pixel clock 215 by n by the frequency multiplication unit 206, and in the first embodiment, obtained by multiplying the pixel clock 215 by eight.

The multiplied clock 218 is inputted to the bias signal generation unit 207, and used to generate the bias control signal 219 for ON/OFF-controlling a bias signal. Also, the multiplied clock 218 is inputted to the PWM generation unit 205, and used to generate the PWM signal 216 for ON/OFF-controlling the semiconductor laser 301 on the basis of the image signal 217.

The image signal 217 is a 4-bit signal in the first embodiment, and each numerical value in FIG. 5 represents the proportion of shading, more specifically, a proportion at which the laser is turned on in one pixel. For example, a numerical value "3" represents that the laser is turned on in ⅜ of a pixel. A numerical value "0" represents that the laser is kept off in one pixel.

Data of the image signal 217 inputted to the PWM generation unit 205 is determined at the leading edge of the pixel clock 215, and outputted from the PWM generation unit 205 at the leading edge of the next pixel clock 215. For example, when the numerical value of the image signal 217 inputted at a leading edge 501 shown in FIG. 5 is 3, the PWM signal 216 is outputted from the PWM generation unit 205 with a pulse width corresponding to ⅜ of a pixel at a next leading edge 502.

The bias signal generation unit 207 controls to enable the bias control signal 219 at timing earlier by ⅛ of a pixel than the PWM signal 216 and disable the bias control signal 219 at the leading edge of the PWM signal 216. When the numerical value of the image signal 217 is 0, the bias control signal 219 is kept off. When the image signal 217 (whose numerical value is not 0) is inputted to the bias signal generation unit 207 at the leading edge 501 of the pixel clock 215, the bias control signal 219 is so controlled as to be enabled ⅛ of a pixel before the leading edge 502 of the next pixel clock 215, and disabled at the leading edge 502 of the pixel clock 215.

As a general characteristic of the semiconductor laser 301, a time of several nsec or more is taken until the luminescence intensity reaches peak intensity. Thus, even if the bias current is supplied ⅛ of a pixel before the PWM signal 216, no ground stain occurs. The timing at which the bias current is supplied may be appropriately set in accordance with the frequency of the pixel clock 215 and the characteristics of the semiconductor laser 301.

The PWM generation unit 205 and bias signal generation unit 207 can be formed from ASICs and the like so as to operate at a high speed.

A current flowing through the semiconductor laser 301 is either the bias current I1 or modulated current I2, and has a current waveform as shown in FIG. 5.

In the first embodiment, the bias control signal 219 is disabled at almost the same timing as the leading edge of the PWM signal 216. However, it is impossible to strictly simultaneously control the leading edge of the PWM signal 216 and the bias control signal 219, and thus the bias current may be stopped while the PWM signal 216 is ON. In this case, the OFF timing of the bias control signal 219 can be set by ⅛ or less of a pixel by also using the trailing edge of the multiplied clock 218 to generate the bias control signal 219.

As described above, the first embodiment can prevent ground stain and the like during supply of the bias current by disabling the bias control signal at the same timing as the leading edge of the PWM signal.

The period during which the bias current is ON can be minimized to reduce power consumption of the laser.

Modification to First Embodiment

In the first embodiment, the OFF timing of the bias control signal 219 is set to the ON timing of the PWM signal 216. When APC control is executed including the bias current, the timing may be changed as follows.

Figure 6:
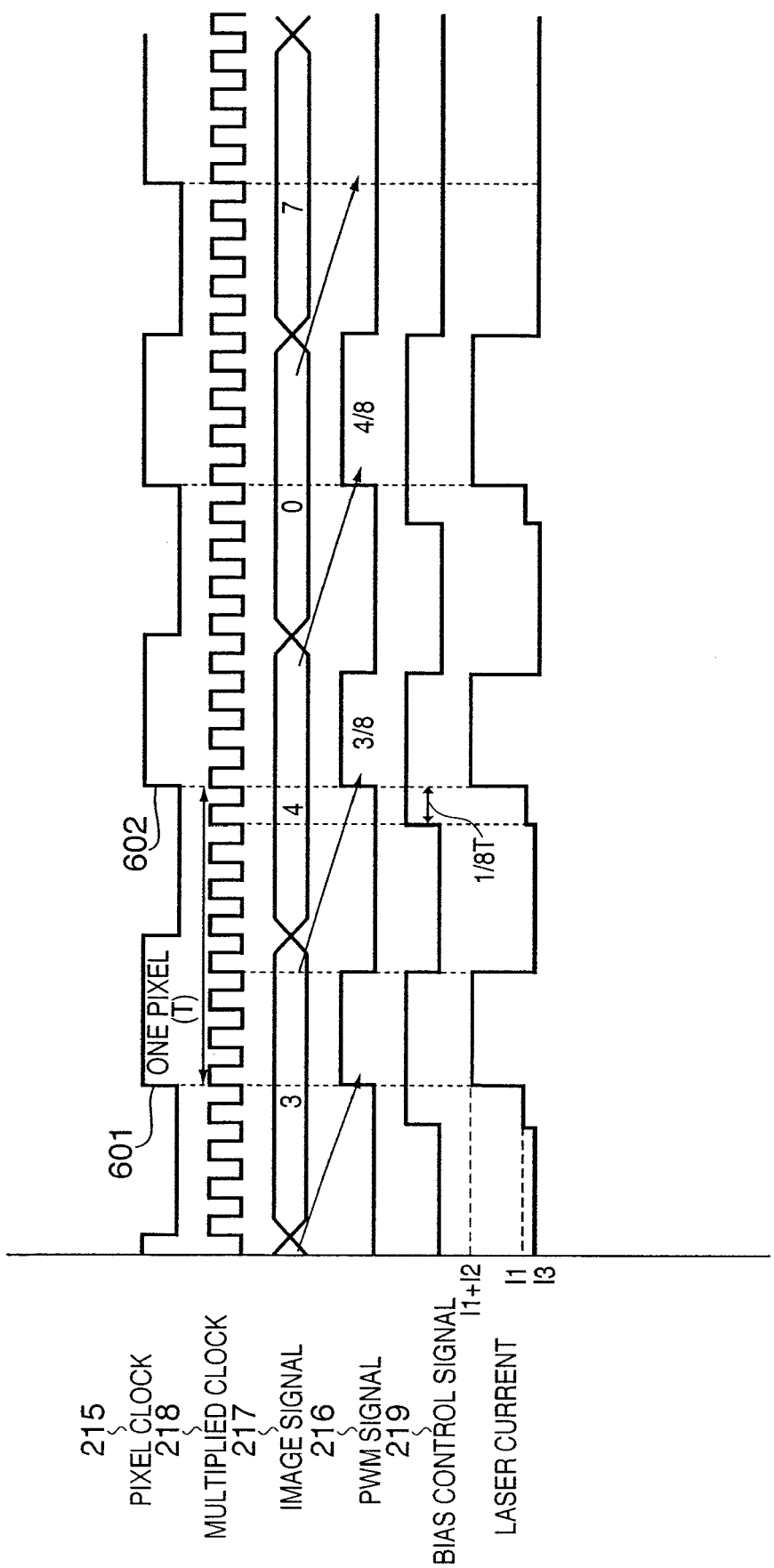
FIG. 6 is a timing chart showing each signal for controlling the laser drive circuit according to a modification to the first embodiment.

FIG. 6 is a timing chart showing each signal for controlling the laser drive circuit according to the modification to the first embodiment. A difference from the first embodiment will be described.

In this modification, the bias signal generation unit 207 controls to enable the bias control signal 219 ⅛ of a pixel before the leading edge of the PWM signal 216 and disable the bias control signal 219 at the same timing as the trailing edge of the PWM signal 216.

A laser current flowing through the semiconductor laser 301 is given by the sum of the modulated current I2 and bias current I1. The laser current while the PWM signal 216 is ON is I1+I2.

According to the modification, the OFF timing of the bias control signal 219 is set to the OFF timing of the PWM signal 216, and APC control can be executed at the sum of the modulated current I2 and bias current I1.

Second Embodiment

The second embodiment according to the present invention will be described in detail with reference to the accompanying drawings. In the second embodiment, a small bias current is supplied to improve the response characteristic of a semiconductor laser.

The arrangement of a color image forming apparatus according to the second embodiment is the same as that described in the first embodiment with reference to FIG. 1, and a description thereof will be omitted. The arrangement of a laser scanner unit is also the same as that described in the first embodiment with reference to FIG. 2.

The arrangement and operation of a laser drive circuit which drives a semiconductor laser on the basis of a PWM signal 216 and bias control signal 219 which are outputted from a laser scanner unit 200 for each color will be explained with reference to FIG. 7.

Figure 7:
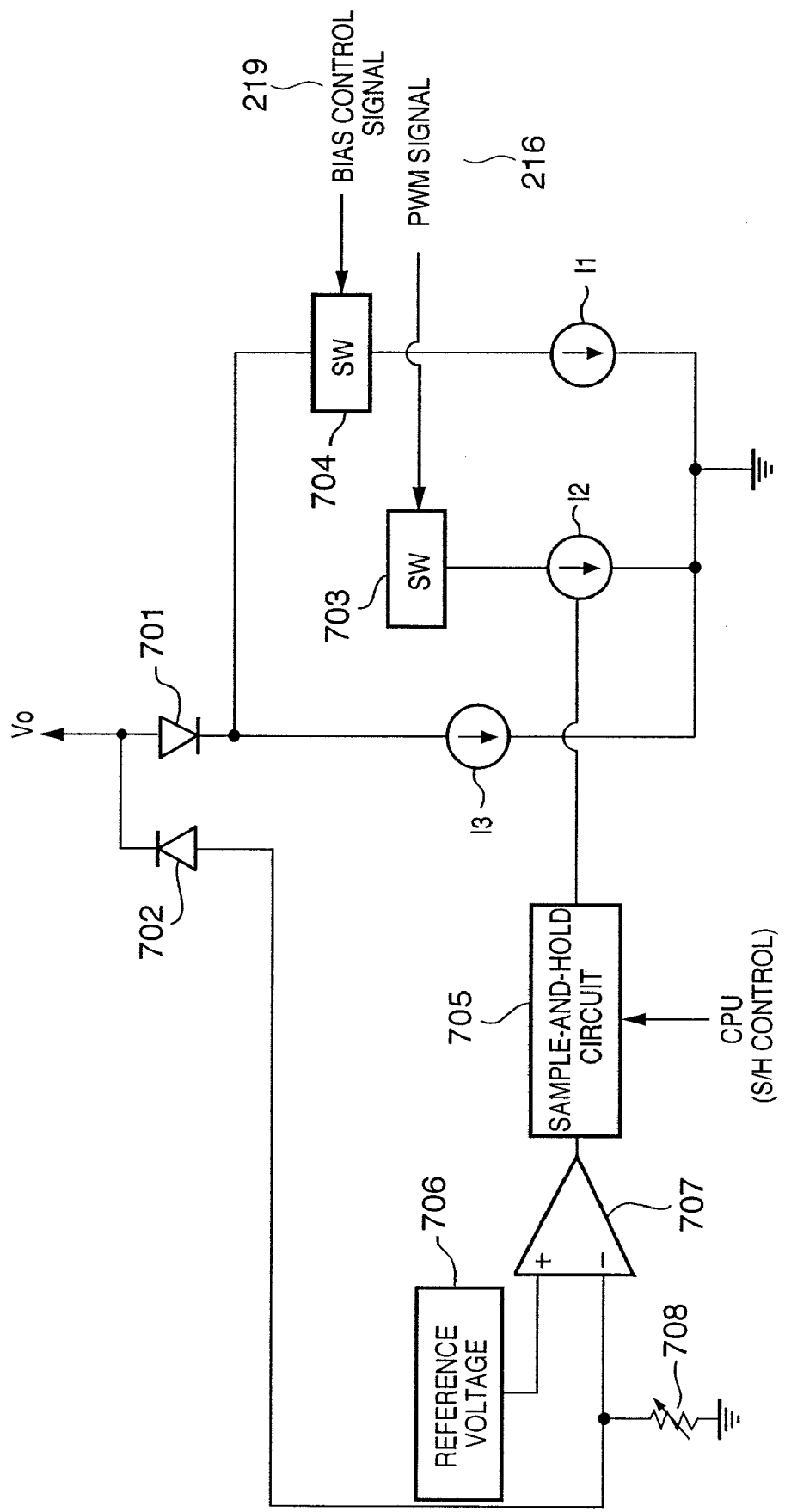
FIG. 7 is a circuit diagram showing the schematic arrangement of a laser drive circuit according to the second embodiment.

FIG. 7 is a circuit diagram showing the schematic arrangement of the laser drive circuit according to the second embodiment. Reference numerals 701 to 708 and reference symbols I1 and I2 in FIG. 7 correspond to reference numerals 301 to 308 and reference symbols I1 and I2 in FIG. 3, and only a difference will be described.

In FIG. 7, reference symbol 13 denotes a second bias current source which always supplies the second bias current as a current smaller than a current from the bias current source I1. The small current suffices to be a current which decreases the impedance of a semiconductor laser 701.

Since the second bias current is a small current, the development bias of the photosensitive member (photosensitive drum) is so set as not to generate ground stain.

The timings of signals (including the second bias current) for controlling the laser drive circuit according to the second embodiment will be explained with reference to FIG. 8.

Figure 8:
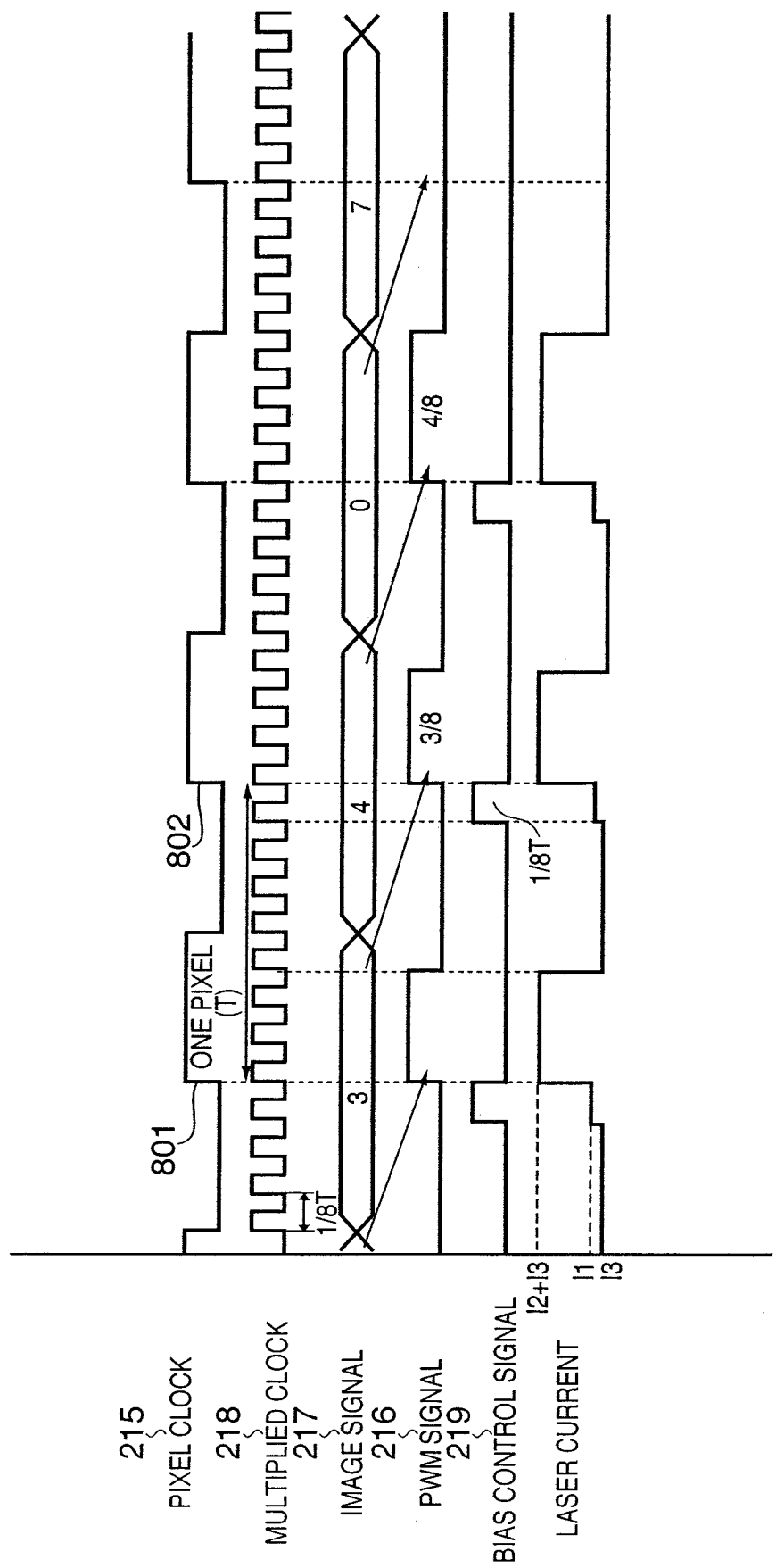
FIG. 8 is a timing chart showing each signal for controlling the laser drive circuit according to the second embodiment.

FIG. 8 is a timing chart showing each signal for controlling the laser drive circuit according to the second embodiment. When an image signal 217 (whose numerical value is not 0) is inputted to a bias signal generation unit 207 at a leading edge 801 of a pixel clock 215, the bias control signal 219 shown in FIG. 8 is so controlled as to be enabled ⅛ of a pixel before a leading edge 802 of the next pixel clock 215 and disabled at the leading edge 802 of the pixel clock.

Since the second bias current source I3 always flows, a laser current flowing through the semiconductor laser 701 is given by the modulated current I2+second bias current I3 while the PWM signal 216 is ON.

In the second embodiment, the bias control signal 219 is disabled at almost the same timing as the leading edge of the PWM signal 216. However, it is impossible to strictly simultaneously control the leading edge of the PWM signal 216 and the bias control signal 219, and thus the bias current may be stopped while the PWM signal 216 is ON. In this case, the OFF timing of the bias control signal 219 can be set by ⅛ or less of a pixel by also using the trailing edge of a multiplied clock 218 to generate the bias control signal 219.

As described above, the second embodiment can improve the response characteristic of the semiconductor laser by always supplying the second bias current as a current smaller than the bias current.

Modification to Second Embodiment

In the second embodiment, the second bias current is always supplied as a current smaller than the bias current, and the OFF timing of the bias control signal 219 is set to the ON timing of the PWM signal 216. When APC control is executed including the bias current, the timing may be changed as follows.

Figure 9:
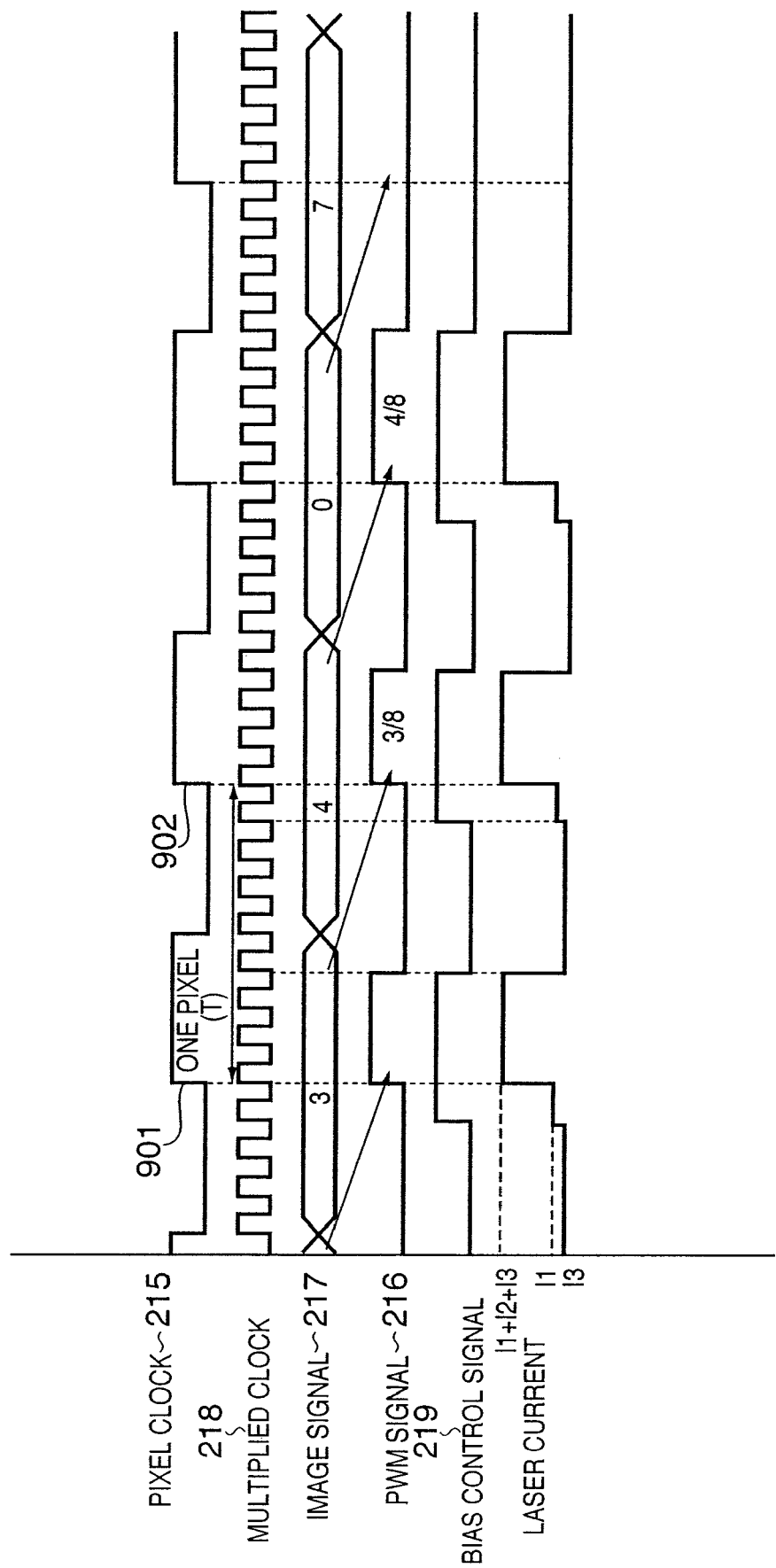
FIG. 9 is a timing chart showing each signal for controlling the laser drive circuit according to a modification to the second embodiment.

FIG. 9 is a timing chart showing each signal for controlling the laser drive circuit according to the modification to the second embodiment. A difference from the second embodiment will be described.

In this modification, the bias signal generation unit 207 controls to enable the bias control signal 219 ⅛ of a pixel before the leading edge of the PWM signal 216 and disable the bias control signal 219 at the same timing as the trailing edge of the PWM signal 216.

Since the second bias current I3 always flows, the laser current is given by the sum of the modulated current I2, bias current I1, and second bias current source I3 while the PWM signal 216 is ON.

According to the modification, APC control can be executed at the sum of the modulated current I2, bias current I1, and second bias current source I3.

Third Embodiment

The third embodiment according to the present invention will be described in detail with reference to the accompanying drawings. In the third embodiment, when the OFF timing of the bias control signal is set to the OFF timing of the PWM signal, similar to the modification to the first embodiment, the timing at which the bias current is supplied prior to an image signal is changed between a case in which the pulse width of a white pixel in an image signal is ⅛ of a pixel and a case in which the pulse width is set to another value.

The arrangement of a color image forming apparatus according to the third embodiment is the same as that described in the first embodiment with reference to FIG. 1, and a description thereof will be omitted. The arrangement of a laser scanner unit is also the same as that described in the first embodiment with reference to FIG. 2. The arrangement of a laser drive circuit is also the same as that described in the first embodiment with reference to FIG. 3.

The timing of each signal for controlling the laser drive circuit according to the third embodiment will be described with reference to FIG. 10.

Figure 10:
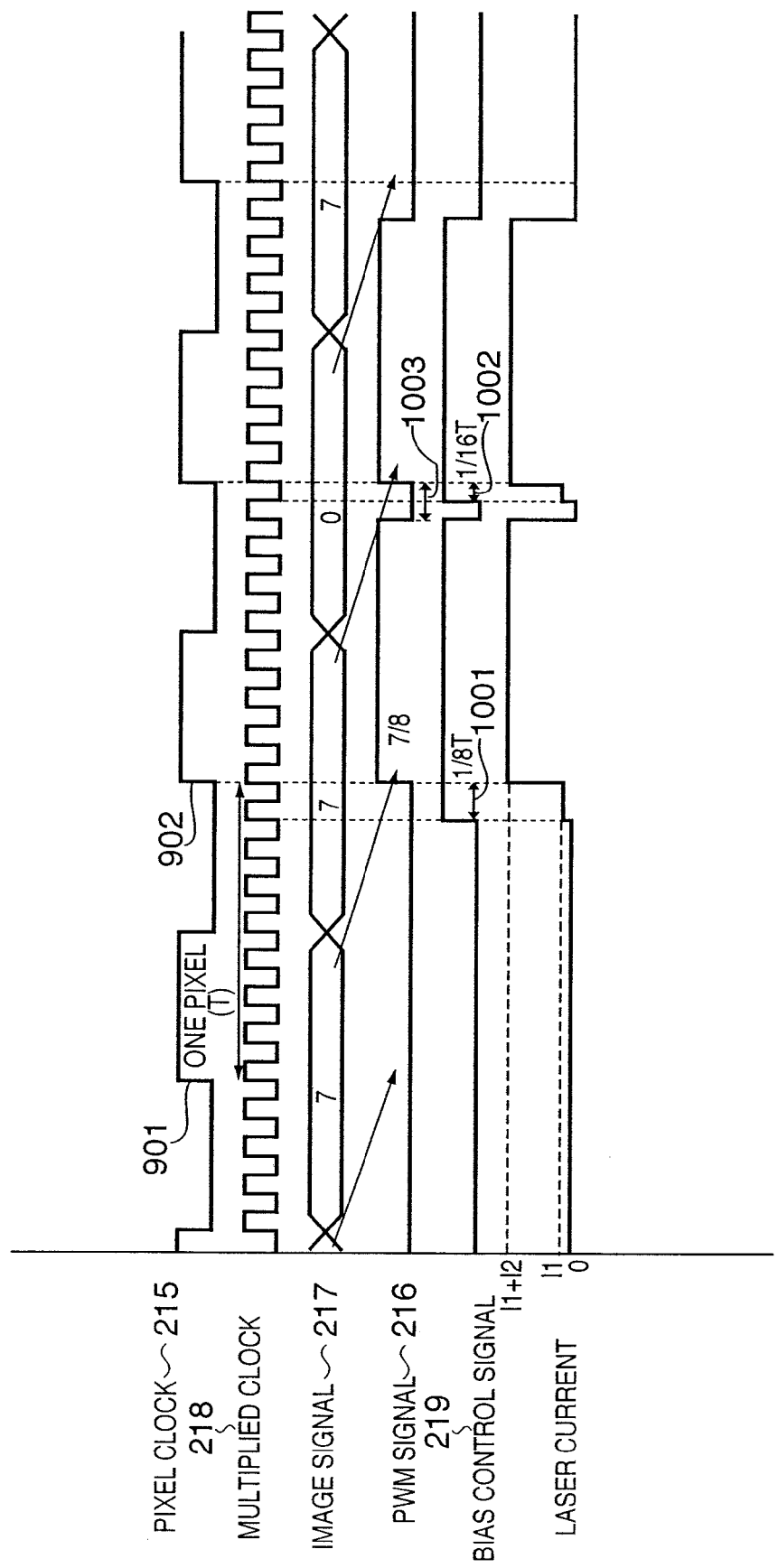
FIG. 10 is a timing chart showing each signal for controlling a laser drive circuit according to the third embodiment.
Figure 11:
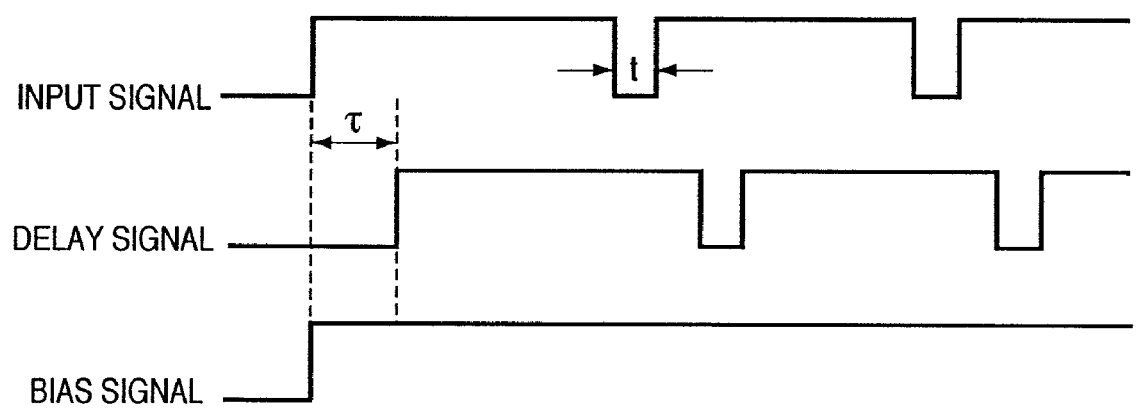
FIG. 11 is a timing chart for explaining a conventional problem that toner is applied onto a white pixel by a bias current.

FIG. 10 is a timing chart showing each signal for controlling the laser drive circuit according to the third embodiment. As shown in FIG. 10, the OFF period (1003) of a PWM signal 216 is ⅛ of a pixel. In this case, if a bias control signal 219 is enabled ⅛ of a pixel before the PWM signal 216, similar to the above-described embodiments, a period during which the bias control signal 219 is disabled cannot be ensured. That is, a bias current I1 is kept on.

To prevent this, when the OFF period of the PWM signal 216 is ⅛ of a pixel, the bias control signal 219 is so controlled as to be enabled 1/16 of a pixel before the ON timing of the PWM signal 216. In accordance with the proportion of shading of an image signal 217, a bias signal generation unit 207 appropriately selects the timing at which the bias control signal 219 is enabled prior to the PWM signal 216.

In general, when the laser OFF period is short because of the characteristics of the semiconductor laser or the influence of residual charges, the delay time till the next leading edge of the laser tends to be short. When the laser OFF period is ⅛ of a pixel, the response characteristic of the semiconductor laser is not impaired even by setting the ON timing of the bias control signal to 1/16 of a pixel. Since the bias current OFF period is always ensured after the laser is turned off, problems such as ground stain can be avoided.

The first to third embodiments can prevent weak exposure caused by a bias current when a blue-violet semiconductor laser is used as a semiconductor laser.

Fourth Embodiment

The fourth embodiment according to the present invention will be described in detail with reference to the accompanying drawings. The fourth embodiment reduces power consumption of a semiconductor laser with a simple arrangement.

The arrangement of a color image forming apparatus according to the fourth embodiment is the same as that shown in FIG. 1, and a description thereof will be omitted.

Figure 12:
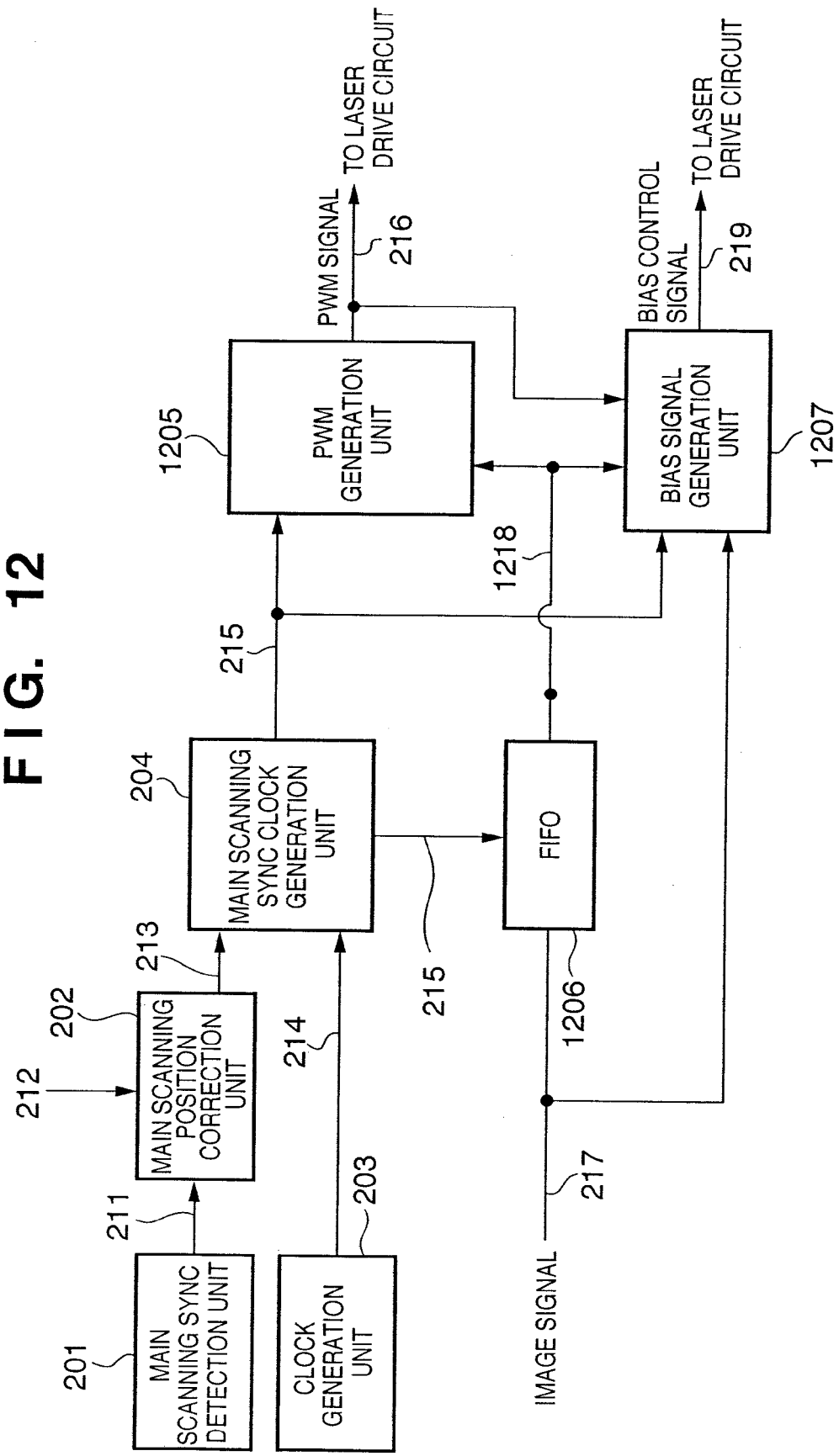
FIG. 12 is a block diagram showing an example of the arrangement of a laser scanner unit according to the fourth embodiment.

FIG. 12 is a block diagram showing an example of the arrangement of a laser scanner unit according to the fourth embodiment. In the arrangement of the laser scanner unit, the same reference numerals as those in the arrangement shown in FIG. 2 denote the same parts, and a description thereof will be omitted.

In FIG. 12, reference numeral 1205 denotes a PWM generation unit which modulates the pulse width of an image signal 1218 outputted from a FIFO (First In First Out) memory (to be described later) on the basis of a pixel clock 215 outputted from a main scanning sync clock generation unit 204, and outputs the modulated image signal 1218 as a PWM signal (laser ON/OFF signal) 216 to a laser drive circuit (to be described later).

Reference numeral 1206 denotes a FIFO (First In First Out) memory which stores, on the basis of the pixel clock 215 synchronized with a main scanning sync signal 213, an image signal 217 of one pixel having undergone a predetermined image process by an image processing unit (not shown). The FIFO memory 1206 outputs, to the PWM generation unit 1205, the image signal 1218 which is delayed by one pixel.

Reference numeral 1207 denotes a bias signal generation unit which outputs, on the basis of the pixel clock 215 and the image signals 217 and 1218, a bias control signal 219 for ON/OFF-controlling the bias current of the laser drive circuit.

The timing of the bias control signal 219 will be described with reference to FIG. 13.

The arrangement of the laser drive circuit according to the fourth embodiment is the same as that shown in FIG. 3, the operation thereof is also the same, and a description thereof will be omitted.

The timing of each signal for controlling the laser drive circuit according to the fourth embodiment will be described with reference to FIG. 13.

Figure 13:
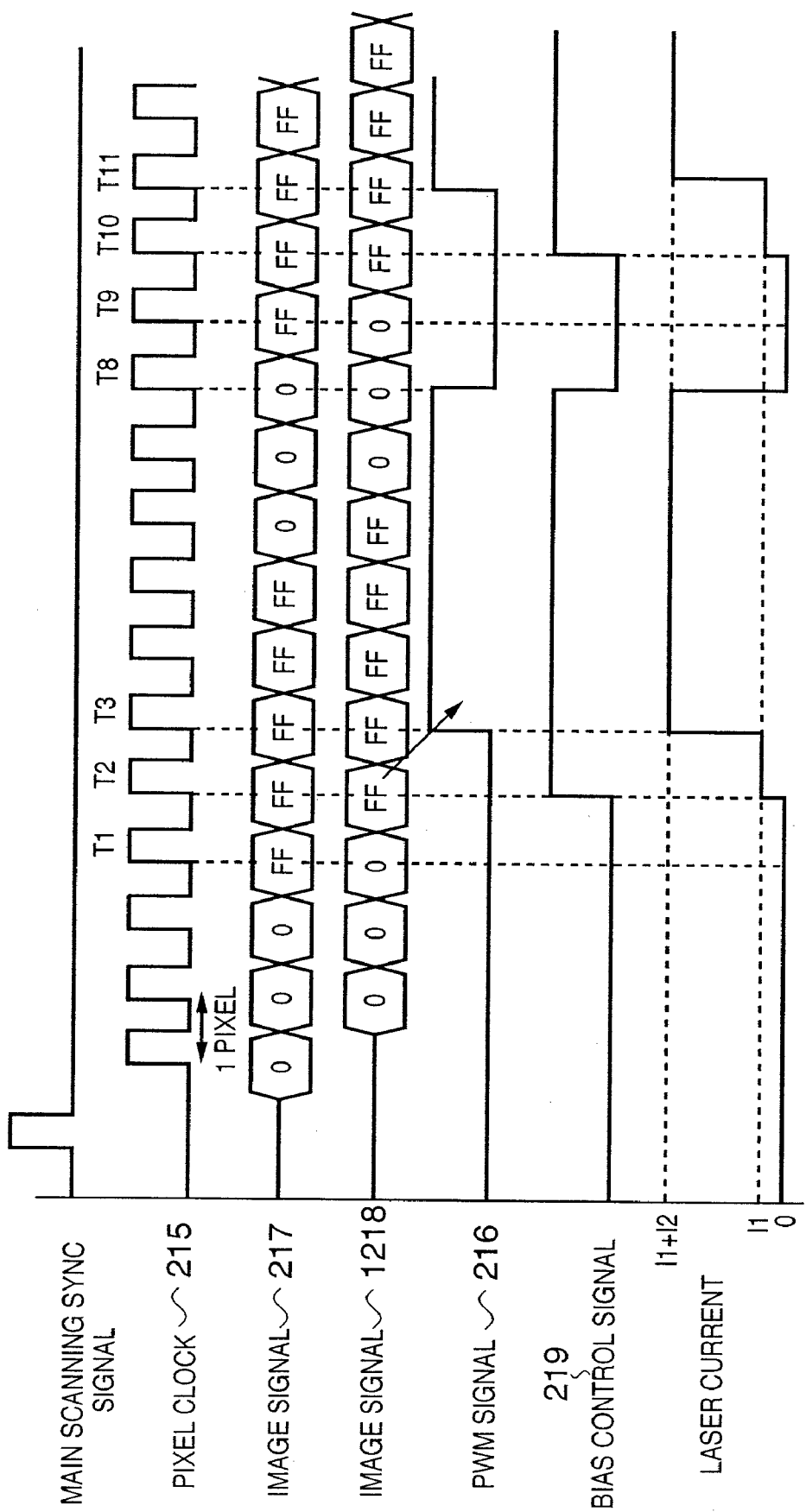
FIG. 13 is a timing chart showing each signal for controlling a laser drive circuit according to the fourth embodiment.

FIG. 13 is a timing chart showing each signal for controlling the laser drive circuit according to the fourth embodiment. The pixel clock 215 which is outputted from the main scanning sync clock generation unit 204 shown in FIG. 13 is enabled/disabled in the cycle of one pixel. In the fourth embodiment, the clock frequency is 20 MHz.

The image signal 217 is transmitted by digital data. In a laser printer according to the fourth embodiment, one pixel is expressed by 256 gray levels. Each numerical value in FIG. 13 represents a proportion at which the laser is turned on in one pixel. For example, a numerical value "FF" represents that the laser is turned on for 256/256 pixel parts of one pixel. A numerical value "0" represents that the laser is kept off in one pixel.

The image signal 1218 is prepared by delaying the image signal 217 by one pixel by the FIFO memory 1206. The image signal 1218 is inputted to the PWM generation unit 1205, data of the image signal 1218 is determined at the leading edge of the pixel clock 215, and the image signal 1218 is outputted as the PWM signal 216 from the PWM generation unit 1205 at the leading edge of the next pixel clock 215.

For example, the image signal 217 (FF) inputted at the leading edge timing T1 of the pixel clock 215 is delayed by the FIFO memory 1206, and inputted as the image signal 1218 (FF) to the PWM generation unit 1205 at the leading edge timing T2 of the pixel clock 215. At the leading edge timing T3 of the next pixel clock 215, the image signal 1218 is outputted as the PWM signal 216 of a pulse width corresponding to the numerical value of the image signal 1218.

The image signal 217 inputted to the bias signal generation unit 1207 is received at the leading edge timing T1 of the pixel clock 215, and the bias control signal 219 is so controlled as to be enabled at the leading edge timing T2 of the next pixel clock 215. When the numerical value of the image signal 217 is 0, the bias control signal 219 is kept off. Further, the bias control signal 219 is so controlled as to be disabled at timing T8 when the PWM signal 216 is disabled. The OFF timing of the PWM signal 216 is determined on the basis of the value of the image signal 1218.

In the fourth embodiment, the ON timing of the bias control signal 219 is set to the leading edge timing of the pixel clock 215, but the bias control signal 219 may be so controlled as to be enabled in synchronism with the trailing edge of the pixel clock 215.

As a general characteristic of a semiconductor laser 301, a time of several nsec or more is taken until the luminescence intensity reaches peak intensity. By supplying a bias current one pixel (corresponding to 50 nsec) or more before the PWM signal 216, the laser can respond at a much higher speed than in a case in which the laser is activated from a zero-bias state.

The PWM generation unit 1205 and bias signal generation unit 1207 can be formed from ASICs and the like so as to operate at a high speed.

A current flowing through the semiconductor laser 301 is the sum of the modulated current I2 and bias current I1, and has a current waveform as shown in FIG. 13.

In the fourth embodiment, the bias control signal is so controlled as to be enabled prior to the PWM signal, and enabled in synchronism with the leading or trailing edge of the pixel clock. Laser drive control which suppresses the temperature rise of the semiconductor laser can be achieved with a simple circuit and control without using any complicated circuit.

Modification to Fourth Embodiment

The OFF timing of the bias control signal 219 is set to the OFF timing of the PWM signal 216 in the fourth embodiment, but may be set to the ON timing of the PWM signal 216.

Figure 14:
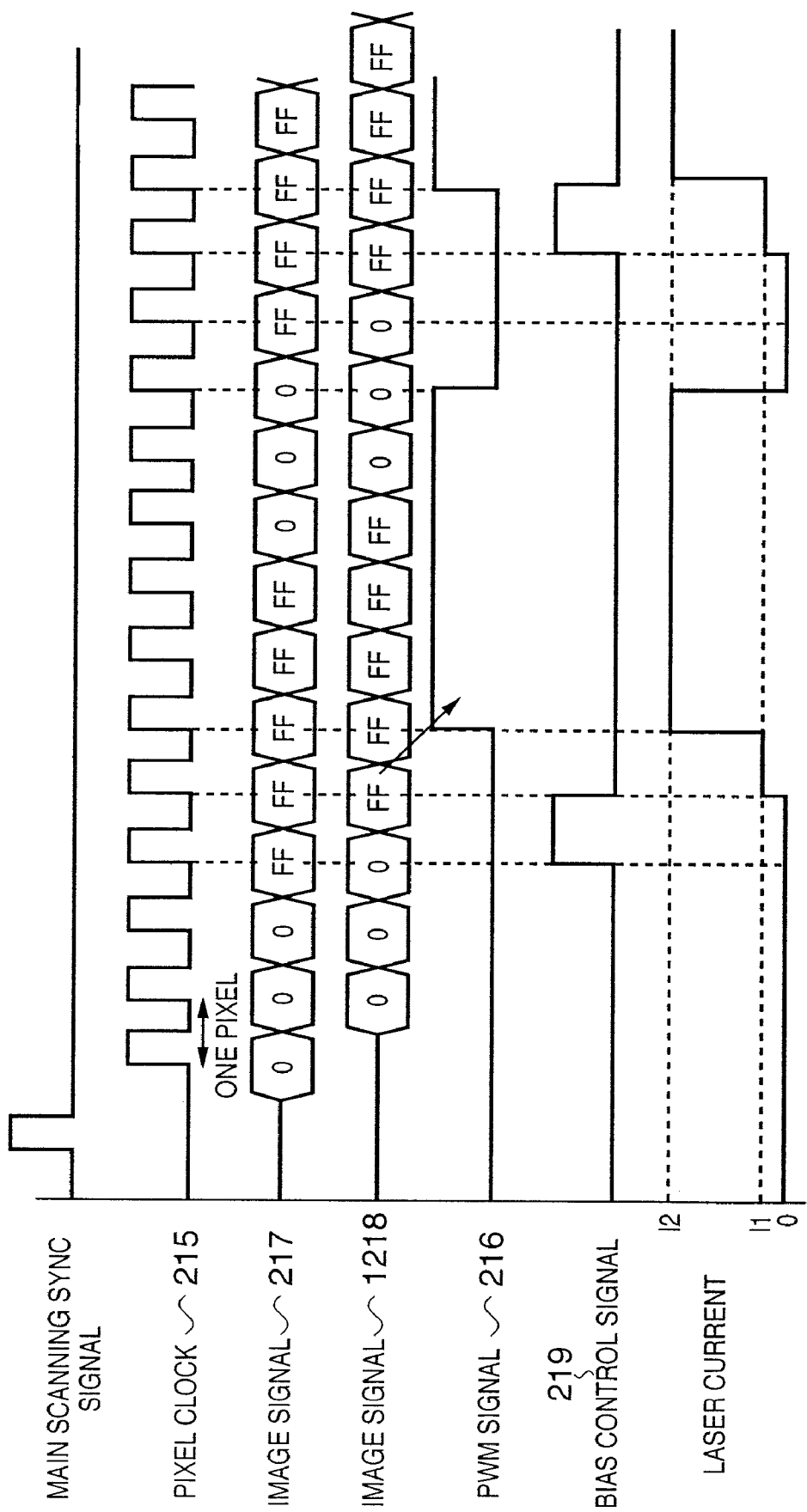
FIG. 14 is a timing chart showing each signal for controlling the laser drive circuit according to a modification to the fourth embodiment.

FIG. 14 is a timing chart showing each signal for controlling the laser drive circuit according to the modification to the fourth embodiment. A difference from the fourth embodiment will be described.

In this modification, the bias signal generation unit 1207 controls to enable the bias control signal 219 before the leading edge timing of the PWM signal 216 and disable the bias control signal 219 at the same timing as the leading edge of the PWM signal 216.

According to the modification, a laser current flowing through the semiconductor laser 301 is given by either the bias current I1 or modulated current I2, and has a current waveform as shown in FIG. 14. The period during which the bias current is ON can be minimized to reduce power consumption of the laser.

The fourth embodiment can reduce power consumption of the semiconductor laser with a simple arrangement when a blue-violet semiconductor laser is used as a semiconductor laser.

The present invention may be applied to a system including a plurality of devices (e.g., a host computer, interface device, reader, and printer) or an apparatus (e.g., a copying machine or facsimile apparatus) formed by a single device.

The object of the present invention is also achieved when a recording medium which records software program codes for realizing the functions of the above-described embodiments is supplied to a system or apparatus, and the computer (or the CPU or MPU) of the system or apparatus reads out and executes the program codes recorded on the recording medium.

In this case, the program codes read out from the recording medium realize the functions of the above-described embodiments, and the recording medium which records the program codes constitutes the present invention.

The recording medium for supplying the program codes includes a Floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the recording medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-221957 and 2004-221958, both filed on Jul. 29, 2004, which are hereby incorporated by reference herein.

What is claimed is:

1. A semiconductor laser drive control apparatus for driving a semiconductor laser based on an input image signal, comprising:
   a modulation signal generation unit adapted to generate a modulation signal having a pulse width which is smaller than the pulse width of one pixel for driving the semiconductor laser based on an image signal inputted in synchronism with a pixel clock; and
   a bias signal generation unit adapted to enable a bias signal for the semiconductor laser based on a timing at which the modulation signal turns ON, and disable the bias signal based on a timing at which the modulation signal turns OFF,
   wherein, when an OFF period that the modulation signal turns ON after turning OFF is longer than a predetermined period, the bias signal is impressed at early timing only for the predetermined period, and when the OFF period of the modulation signal is not longer than the predetermined period, the bias signal is impressed at early timing only for a shorter period than the predetermined period.

* * * * *